US011214001B2

(12) United States Patent
Verzwyvelt et al.

(10) Patent No.: US 11,214,001 B2
(45) Date of Patent: Jan. 4, 2022

(54) FUSION INHIBITING AGENTS WITH COLORANTS

(71) Applicant: HEWLETT-PACKARD DEVELOPMENT COMPANY, L.P., Spring, TX (US)

(72) Inventors: Vanessa Verzwyvelt, Vancouver, WA (US); Matthew A. Shepherd, Vancouver, WA (US); Jake Wright, San Diego, CA (US); Hector Lebron, San Diego, CA (US); Morgan T. Schramm, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 654 days.

(21) Appl. No.: 16/075,705

(22) PCT Filed: Jul. 10, 2017

(86) PCT No.: PCT/US2017/041363
§ 371 (c)(1),
(2) Date: Aug. 6, 2018

(87) PCT Pub. No.: WO2019/013749
PCT Pub. Date: Jan. 17, 2019

(65) Prior Publication Data
US 2021/0206058 A1 Jul. 8, 2021

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/291* (2017.08); *B29C 64/295* (2017.08);
(Continued)

(58) Field of Classification Search
CPC ... B29C 64/165; B29C 64/291; B29C 64/295; B33Y 70/00; B33Y 10/00; B33Y 30/00; B29K 2995/002
See application file for complete search history.

(56) References Cited

U.S. PATENT DOCUMENTS

| 7,708,929 B2 | 5/2010 | Monsheimer et al. |
| 8,167,999 B2 | 5/2012 | Alam et al. |
(Continued)

FOREIGN PATENT DOCUMENTS

| CN | 108778684 | 11/2018 |
| EP | 3397455 | 11/2018 |
(Continued)

OTHER PUBLICATIONS

Grunewald, "HP Reveals More Info About Their Multi Jet Fusion 3D Printing Technology, Plans for Second 3D Printer", Retrieved from Internet: https://3dprint.com/113630/hp-multi-jet-fusion-plans-info/, Jan. 4, 2016, 6 pages.

*Primary Examiner* — Nahida Sultana
(74) *Attorney, Agent, or Firm* — HP Inc. Patent Department (57) ABSTRACT

In an example, a method includes providing a build material. Print agent comprising colorant may be applied to a first portion of the build material to be fused in additive manufacturing, wherein the print agent is applied according to a target color for the first portion. A combination of a fusion inhibiting agent and colorant may be applied to a second portion of the build material, wherein the print agent is applied according to the target color of the first portion and the second portion is adjacent to the first portion. The method may further include heating the build material by exposing the build material to radiation so as to cause fusing of the first portion.

15 Claims, 3 Drawing Sheets

(51) Int. Cl.
  *B33Y 30/00* (2015.01)
  *B33Y 70/00* (2020.01)
  *B29C 64/295* (2017.01)
  *B29C 64/291* (2017.01)

(52) U.S. Cl.
  CPC .............. *B33Y 10/00* (2014.12); *B33Y 30/00* (2014.12); *B33Y 70/00* (2014.12); *B29K 2995/002* (2013.01)

(56) References Cited

U.S. PATENT DOCUMENTS

| | | |
|---|---|---|
| 10,707,232 B2 * | 7/2020 | Lee .................. H01L 21/31111 |
| 2006/0290032 A1 * | 12/2006 | Sano .................... B29C 64/165 |
| | | 264/494 |
| 2007/0238056 A1 | 10/2007 | Baumann et al. |
| 2017/0266728 A1 * | 9/2017 | Johnson ................ B33Y 50/02 |
| 2018/0126541 A1 * | 5/2018 | Jeremenko ............... H02G 1/02 |
| 2018/0126663 A1 * | 5/2018 | Jun ........................ B22F 10/20 |

FOREIGN PATENT DOCUMENTS

| | | |
|---|---|---|
| WO | WO-01/038061 | 5/2001 |
| WO | 2016068899 A1 | 5/2016 |
| WO | 2016169620 A1 | 10/2016 |
| WO | WO-2016171724 A1 | 10/2016 |
| WO | WO-2016175817 A1 | 11/2016 |
| WO | 2017019102 A1 | 2/2017 |
| WO | WO-2017019088 | 2/2017 |
| WO | 2017065796 A1 | 4/2017 |
| WO | WO-2017065796 A1 | 4/2017 |
| WO | WO-2018080456 | 5/2018 |

* cited by examiner

FUSION INHIBITING AGENTS WITH COLORANTS

BACKGROUND

Three-dimensional (3D) printing is an additive manufacturing process in which three-dimensional objects may be formed, for example, by the selective solidification of successive layers of a build material. The object to be formed may be described in a data model. Selective solidification may be achieved, for example, by fusing, binding, or solidification through processes including sintering, extrusion, and irradiation. The quality, appearance, strength, and functionality of objects produced by such systems can vary depending on the type of additive manufacturing technology used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the layer of build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to a layer of the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

Another example of a print agent is a coalescence modifying agent (which may also be referred to as a modifying or detailing agent herein), which acts to modify the effects of a fusing agent and/or energy applied for example by inhibiting, reducing or increasing coalescence or to assist in producing a particular finish or appearance to an object, and such agents may therefore be termed detailing agents. In some examples, the coalescence modifying agent is a fusion inhibiting agent. Such agents may for example cool build material (for example through evaporation), and may include water, an alcohol, a glycol or the like (for example ethanol, ethylene glycol, glycerin/glycerol, and/or propylene glycol). In other examples, a fusion inhibiting agent may be chemically formulated so as to prevent fusion.

A property modification agent, for example comprising a dye, coloring agent, a conductive agent, an agent to provide transparency or elasticity or the like, may in some examples be used as a fusing agent or a modifying agent, and/or as a print agent to provide a particular property for the object. For example, a coloring agent, for example comprising a dye or colorant, may in some examples be used as a fusing agent or a modifying agent, and/or as a print agent to provide a particular color for the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

Figure 1:
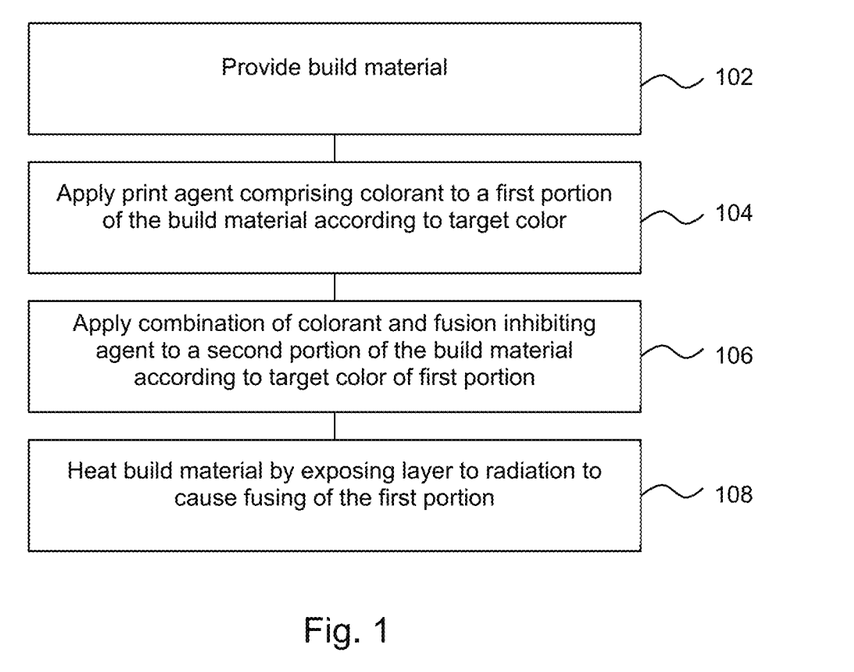
FIG. 1 is an example of a method of generating an object using additive manufacturing.

FIG. 1 shows an example of a method of generating an object using additive manufacturing.

Block 102 comprises providing build material. For example, one or more layers of build material may be formed of a granular material, such as a granular plastic material. The build material may be a powder, a liquid, a paste, or a gel. Examples of build material include semi-crystalline thermoplastic materials. A layer may for example be formed on a print bed, or on a previously formed and processed layer of build material.

Block 104 comprises applying, to a first portion of build material which is to be fused in additive manufacturing, print agent comprising colorant, wherein the print agent is applied according to a target color for the first portion. The first portion is a portion of the build material which it is intended to fuse in additive manufacturing, for example to form part of the object.

The colorant may in some examples comprise a colored print agent, a combination of a plurality of colored agents, or at least one colored agent and a fusing agent. The colorant may comprise organic pigment, inorganic pigment, organic dye, thermochromic dye such as leuco dye, or the like. The colorant may be selected to (in some examples in combination with a fusing agent) provide a target color within a color space which may be applied to the layer of build material. For example, the colorant may comprise a choice of different colored agents, for example, from a CYMK (cyan, magenta, yellow, and black) color set, in some examples with the addition of orange green and violet colored agents, and/or light versions of the CYM agents, and the like. In other examples, alternative colorant sets may be provided.

In some examples, application of print agent is carried out using a print agent distributor, for example a print head which may dispense print agent using 'inkjet' techniques or the like, and which may for example move relative to the layer of print agent, and may perform at least one printing pass of the layer of build material. The print agent may be applied from a plurality of print agent sources to provide the target color (for example using appropriate halftoning techniques), or may be pre-mixed to provide the target color.

Applying print agent to the first portion comprises applying a fusing agent to the first portion. The fusing agent may be an absorber of IR radiation, visual radiation, near IR radiation or the like.

For example, the fusing agent may comprise an agent having a high energy absorptance (noting that a material's "absorptance" relates to its effectiveness in absorbing radiant energy) in the infra-red and/or near infrared range, for example a carbon black-based print agent, or an alternative (for example a low-tint) fusing agent, for example comprising a Caesium Tungsten Bronze, or a Caesium Tungsten Oxide composition which may be lighter in color than a carbon black based print agent.

In other examples, the colorant(s) themselves may be sufficiently efficient thermal absorbers to act as fusing agent and/or the radiation applied may be sufficient to cause fusing thereof. For example, the energy may be infrared energy: any agent which is not transparent in the infrared region will absorb at least some energy which may cause heating. In some examples, the radiation may be increased so as to cause fusion with applied agents of relatively low absorptance. In some examples, print agent may be applied to comprise fusing agent for some target colors and not for others to achieve a print agent with an acceptable thermal absorptance.

In some examples, while a fusing agent may be black in color, a black colorant of a colorant set such as the CMYK colorant set may comprise a cosmetic black colorant, selected for its color properties, whereas a black colored fusing agent may comprise a material (such as carbon black) selected for its absorptance in the near-infrared range. In other words, a cosmetic black colorant may be provided in addition to at least one fusing agent, even where that fusing agent is black in color. The cosmetic black agent may have lower absorptance that the fusing agent in a waveband of radiation intended to result in heating of the build material.

Block 106 comprises applying, to a second portion of the build material, a combination of a fusion inhibiting agent and colorant, wherein the colorant is applied according to the target color of the first portion.

The fusion inhibiting agent may comprise a coolant, for example water or some other substance which tends to inhibit fusion. The fusion inhibiting agent may have a color, which may be taken into account when determining what colorants are applied to provide the target color. The second portion may be a portion which is not intended to form part of the object under generation. The second portion is adjacent to the first portion, and in some examples the first and second portion may be in the same layer as one another. For example, the second portion may comprise a border region which surrounds at least part of the first portion of the layer which is to be solidified to provide a layer of the object. In other examples, the second portion may be in a first layer and the first portion may be in an adjacent layer.

The applied agents may be applied in stages, for example a fusion inhibiting agent may be overprinted with one or more colorants, or vice versa.

The colorant applied to the second portion in some examples may comprise a combination of colored print agents that is different to the combination of colored agents in the colorant applied to the first portion of the build material in block 104, even when it is intended that these portion are substantially the same color. This allows for a difference in color which may arise due to presence of fusing agent and/or fusion inhibiting agent in at least one of the first and second portions to be compensated for by altering the combination of colorants.

In some examples, colored print agents may be taken from the same set of colored print agents as is applied to the first portion. For example, a selection from the same set of CMYK color agents may be applied to both portions, but the relative amounts of each color agent may differ between portions.

In some examples, an amount of fusion inhibiting agent to be applied in block 106 may be determined based on an energy absorptance of the colorant applied to the second portion. For example, if a colorant (or combination of colored agents) with a relatively high energy absorptance is applied to the second portion, this will mean that the colorant at the second portion comparatively absorbs more thermal energy during a fusion process of the first portion than if the colorant has a relatively low energy absorptance. In order to reduce the likelihood of fusion occurring in the second portion, the effect of using a colorant with a relatively high energy absorptance can be offset by an increased amount of fusion inhibiting agent.

Similar to block 104, in some examples, applying print agent to the second portion is carried out using a print agent distributor, for example a print head which may dispense print agent using 'inkjet' techniques or the like, and which may for example move relative to the layer of build material, and may perform at least one printing pass of a layer of build material.

The amount of fusion inhibiting agent to be applied to the second portion of the build material may also be determined based on other factors, such as an efficiency with which the fusing agent applied to the first portion absorbs radiation (as this can result in heating of the second portion), the energy to be applied to the build material and/or a thermal profile across a boundary between the first portion and the second portion, as is described in greater detail below.

Block 108 comprises heating the build material by exposing the build material to radiation so as to cause fusing of the first portion. For example, this may comprise exposing a layer containing the first portion to a heat source such as a heat lamp. In some examples, heating is carried out at least partially concurrently with print agent application (for example, a print agent applicator may comprise a heat source).

Blocks 104 and 106 may be carried out in an overlapping timeframe, for example as a print agent applicator is scanned over a layer of build material. As such, application of the print agent to the first and second portions may be interleaved depending on the position of the print agent applicator over the layer of build material. Heating in block 108 may in part be carried out before, during and/or after print agent application.

In the example of FIG. 1, there are two portions. However, in another example, there may be further portions. For example, the portion to be fused may comprises different colors, and there may be additional portions to which fusion inhibiting agents are applied with colorants to match the different colors of the fused portion.

Figure 2A:
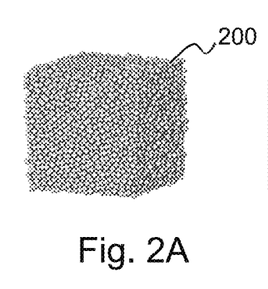
FIGS. 2A, 2B and 2C show examples of different statuses of a section of build material to be fused by additive manufacturing.
Figure 2B:
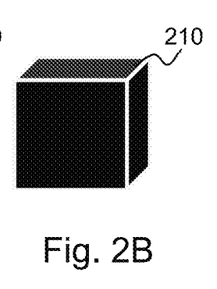
Figure 2C:
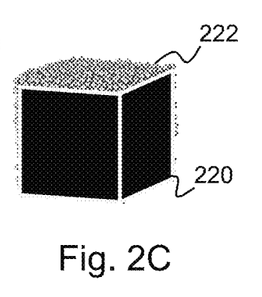

FIG. 2A shows a section of build material to be formed into a part of an object, before fusion. FIG. 2B shows a section of the build material, after fusion, where all or most of the powder particles are fused. FIG. 2C shows another example of a section of the build material after fusion.

FIG. 2A shows an example of a section of build material 200 before fusion. In this example, a cube of build material in powder form is to be fused to form a solid cube. The powder may be white in color. FIG. 2B shows an 'ideal' result of fusing: the entire section of the build material undergoes fusion to form a solid cube 210 having a sharply defined outer surface.

The fusion process may be carried out in a layer-wise manner, with a layer of build material being formed, partially treated with print agent to cause fusing of build material to provide a portion of the object lying within that layer. While untreated white, or light colored, build material may tend to reflect heat, the treated build material may tend to absorb heat, raising the temperature to cause fusion. In practical additive manufacturing there may be a thermal gradient across the section of build material especially at the boundaries between a portion to be fused and a portion to remain unfused, which can cause particles 222 to adhere to edges of the fused portion.

As the process continues, this can result in an object, such as the cube 220 as is shown in FIG. 2C which has particles adhering to the external surfaces thereof. FIG. 2C shows the section of build material in which an amount of unfused or partially fused powder particles 222 are attached to an outer surface of the section of build material after the cube 220 is formed by fusion. In FIG. 2C, two faces are shown as free of such particles 222 to demonstrate the principle, but in practice particles 222 may adhere to all faces.

As a result, in some examples of additive manufacturing, after fusion of an intended portion of build material, build material particles at the edges of the fused portion may be partially fused, and/or unfused particles may adhere to the fused portion, leading to build material particles being attached at the edges or surfaces. In examples where the build material is light or white in color, this may cause an edge and/or surface part to appear in a lighter color due to the optical scattering and refraction behaviour of the partially fused particles.

This may cause an unintended shift from the intended color of an object, which may impair the appearance of the object and/or lead to post-processing to remove the particles 222.

Moreover, some colorant used in the print agent may have limited diffusivity of the colorant when penetrating build material. The limited diffusivity of these colorants may contribute to the lack of color in build material particles that are partially fused. As a result of the limited diffusivity of some colorants, the edge or surface of the 3D object may appear to have a pattern. The pattern may include areas of color and areas of white, which may be an undesirable effect. As an example, the pattern of colored and white areas may resemble a wood grain-like pattern.

In the examples herein, the second portion (which may be considered as an 'atmosphere' of the object) has a color matching that of the section of the build material which is fused (i.e. the first portion).

Figure 3:
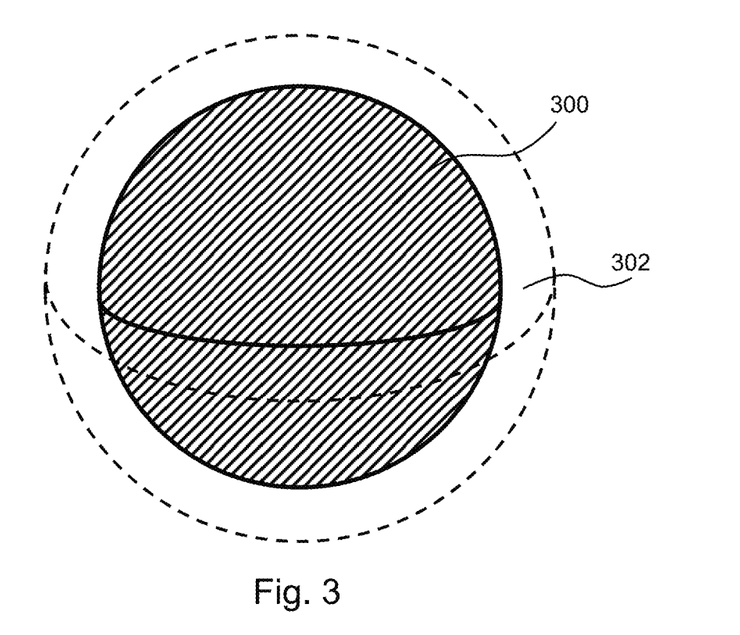
FIG. 3 is an example of a representation of a model of an object and an external portion.

FIG. 3 shows an example in which the object to be generated is a sphere 300. The body of the sphere 300 may comprise the first portion. The second portion will, as successive layers are generated, form an 'atmospheric' second portion 302 around the sphere 300.

Since print agent that is applied to the second portion 302 is determined based on the target color of the sphere 300, the color of the second portion 302 can match that of the sphere 300 after fusion. Undesired cosmetic effects at the edges or on the surfaces of the object to be formed can therefore be reduced or avoided.

The first portion of the build material is intended to be fused so as to form at least part of the object while the second portion of the build material is intended to remain unfused or partially fused (but which may become attached to an edge or a surface of the first portion of the build material). In order to match the target color of the first portion of the build material (which may be provided by the combination of colorants and/or fusing agents applied to the first portion), the effect that the fusion inhibiting agent has on the colorant, and vice versa, (for example in terms of absorptance of thermal energy and/or color) may be taken into account when applying combination of fusion inhibiting agent and colorant to the second portion.

The amount of thermal energy available for fusing in the first portion depends in part on the efficiency with which print agent applied to the build material absorbs radiation, and the radiation absorptivity of the print agent applied depends at least in part on the color of the colorants. For example, the absorption intensity of near-infrared dye-based fusing agent with cyan, magenta, or yellow (C, M, or Y) color dye is generally lower than that of, for example, carbon black-based fusing agent which is an effective absorber of energy.

The choice of agents which are applied to the first portion may be determined in order to achieve a particular color and/or fusion behaviour. For example, darker colors may be provided with a combination of colorants and carbon black based fusing agent, while lighter colors may be provided with a combination of colorants and low tint fusing agent. In some examples, an intended level of fusion may be achieved without fusing agent. In general, the choice and/or amount of fusing agent may have an effect on the color of the first portion when fused.

In some examples, the method may comprise determining the print agent to be applied to the first portion of build material (which may be a combination of colored agents and/or fusing agents, which may be combined prior to application or applied separately such that a layer of build material receives drops of different agents when print agent is applied) such that the temperature of the first portion of the build material is substantially consistent during heating thereof regardless of the color of the first portion (e.g. a cyan region of an object may be substantially the same temperature as a yellow region of the same object). In some examples, the method may comprise determining the print agent to be applied to the second portion of the build material (which may be a combination of agents) such that the temperature of the second portion of the build material is consistent during heating thereof (and at a lower temperature than the first portion of the object), regardless of the color of the second portion (e.g. a cyan region of an object atmosphere is the same temperature as a yellow region of the same object atmosphere). This may be achieved by controlling an amount and/or type of fusing agent/fusing inhibiting agent applied. When both the first and second regions are at a substantially constant temperature, a substantially uniform thermal profile across a boundary between the first and second regions can be achieved around the surfaces of the object. This may result in a consistent level of unintended particle adherence, which may increase the consistency of the appearance of the object.

Determining the print agent (which may be combination of different agents) to apply to the first portion may be based on object geometry, and may comprise determining a local feature size, or the cross sectional area of the object at a location, as is further explained below. In another example, determining the print agent may be based on the location of a portion within an object, with inner portions being treated differently to outer portions. In some examples, the print agent selected may be determined to provide an intended property and/or a quality specification. In another example, print agent for a portion may be first determined based on a target color for the first portion and a proportion of at least one of the fusing agent, fusion inhibiting agent, and colorant in the print agent, may then be adjusted further so as to optimise a different property (e.g. strength) given the constraint associated with the target color.

The first and second portions may be defined for an object as a whole (which may then be 'sliced' to determine the first and second portions for a layer) or may be defined for a 'slice' of the object which may correspond to a layer of the object to be generated in a layer-by-layer additive manufacturing process. Other aspects of print agent application, for example a coverage of a print agent, may be selected on a portion by portion basis.

The first portion and the second portion of the build material may be processed using different 3D print processing parameters, including for example print agent coverage levels, so as to achieve intended color properties for the portion. For example, there may be a mapping between colors and print instructions specifying coverages of the print agents to provide the colors. The mapping may for example be in the form of a look up table, or based on a color prediction model or the like.

As mentioned above, in some examples, the print agent to be applied may depend on the local geometry of the respective portion. For example, for smaller features of the object (for example, points, extensions, detailed or convoluted portions), the proportion of at least one of the fusing agent, the fusion inhibiting agent, and the colorant in the print agent may be different from larger features of the objects. The visual quality standards for may differ over an object: portions of the object which are unlikely to be visible in normal use, or which are relatively small or geometrically complex (the human eye being relatively less sensitive to color variations over such areas) may be printed with a lower quality standard applied to color. Finer features may benefit from additional strength provided by the hotter fusing temperatures produced when fusing agent is used (or is used in relatively high amounts). In another example, the bottom section of an object may have different dimensional tolerances or strength specifications than the top of a part, and therefore print agent to be applied to such a portion may be selected accordingly.

Figure 4:
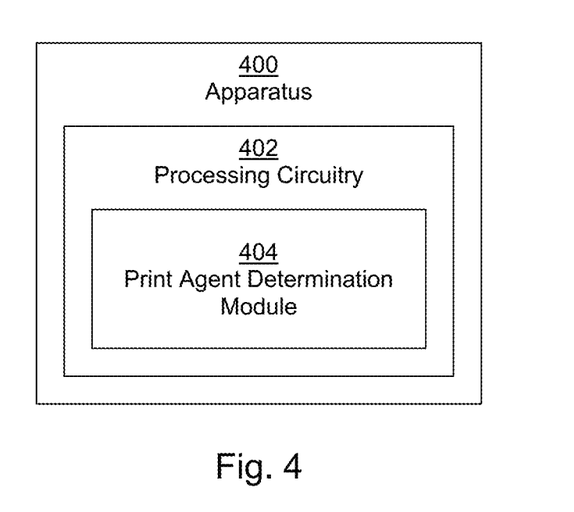
FIGS. 4 and 5 are examples of apparatus for processing data relating to additive manufacturing.

FIG. 4 is an example of an apparatus 400 comprising processing circuitry 402, the processing circuitry 402 comprising a print agent determination module 404. The print agent determination module 404, in use of the apparatus 400, determines, based on a target color of a first portion of a build material to be fused in additive manufacturing of an object, a combination of fusion inhibiting agent and colorant to be applied to a second portion of the build material which is to remain unfused in additive manufacturing of the object and which is adjacent to the first portion, wherein the combination of fusion inhibiting agent and colorant is to provide the target color.

For example, the determination may be made based on a combination of colored agents applied to the first portion, and/or the fusing agent applied to the first portion, and/or a relative ratio of the fusing agent and the colorant in the print agent applied to the first portion.

In some examples, the target color may be stored or provided as part of a data model. This data model may for example comprise object model data and object property data. This information may for example be stored in or received from a memory, over a network, over a communications link or the like. The data model may define a three-dimensional geometric model of at least a portion of the object to be generated in additive manufacturing, including the shape and extent of all or part of an object in a three-dimensional coordinate system, e.g. the solid portions of the object. The object model data may for example be generated by a computer aided design (CAD) application. Object property data may define at least one object property for the three-dimensional object to be generated. In one example, the object property data may comprise any or any combination of appearance, mechanical and/or functional properties, for example specifying target color, flexibility, elasticity, rigidity, surface roughness, porosity, density, conductivity, transparency and the like for at least a portion of the object to be generated. The object property data may define multiple object properties for a portion or portions of an object. If no object property data is present the object may have some default properties based on the build material and print agents used.

In some examples, the print agent determination module 404 is, in use of the apparatus 400, to determine the combination of print agents to be applied to the second portion of the build material such that the color of the second portion at least substantially matches the color of the first portion after fusion of the first portion (noting that fusion may change the color properties of the first portion). In some examples, the determination takes into account of other intended properties of the first portion, for example a strength, resilience, conductivity or the like. In some examples the print agent determination module 404 may determine the combination using a look-up table, or may determine a combination based on a model or predicted color for a combination of print agents.

Figure 5:
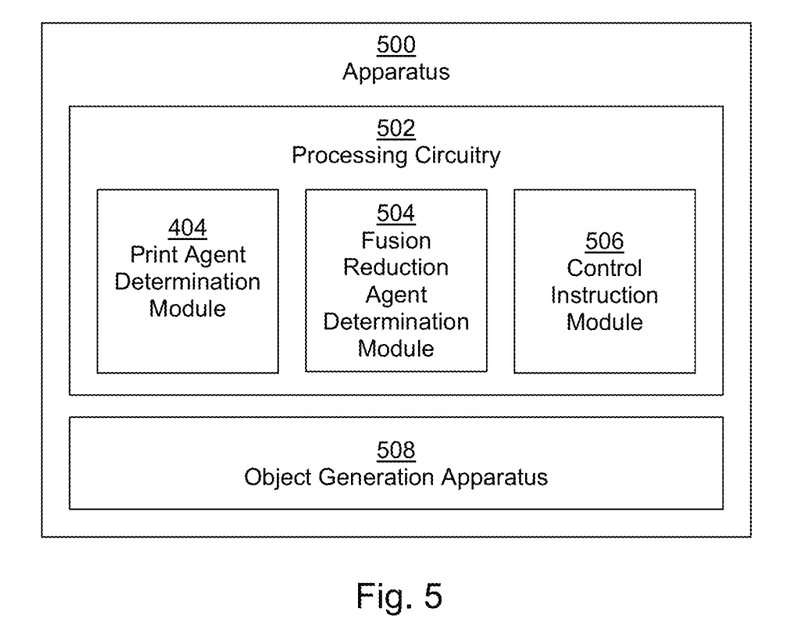

FIG. 5 shows an example of an apparatus 500 comprising processing circuitry 502 which comprises the print agent determination module 404 as well as a fusion inhibiting agent determination module 504 and a control instruction module 506. The apparatus 500 further comprises an object generation apparatus 508.

In use of the apparatus 500, the fusion inhibiting agent determination module 504 determines an amount of a fusion inhibiting agent to be applied to the second portion of the build material. The amount of fusion inhibiting agent to be applied to the second portion is determined based on an absorptance of the colorant applied to the second portion of the build material. In some examples, the amount of fusion inhibiting agent to be applied to the second portion is based on an absorptance of the colorant in the near infrared-range. The amount of fusion inhibiting agent may also be based on a number of other factors, including the target color of the first portion of the build material.

In use of the apparatus 500, the control instruction module 506 generates control instructions for generating an object using the print agent for the object portions. In some examples, the generation of control instructions uses different processing parameters for different portions. For example, the additive manufacturing control instructions for each portion may be generated using different processing parameters. The processing parameters for the first portion may for example allow selection of a fusing agent and not a fusion inhibiting agent, whereas the second portion may allow selection of a fusion inhibiting agent and not a fusing agent. The control instructions 5056 may utilise the output of the print agent determination module 404 and/or the fusion inhibiting agent determination module 504

The object generation apparatus 508 is to generate the object according to the control instructions, and may to that end comprise additional components such as print bed, build material applicator(s), print agent applicator(s), heat sources and the like, not described in detail herein.

Figure 6:
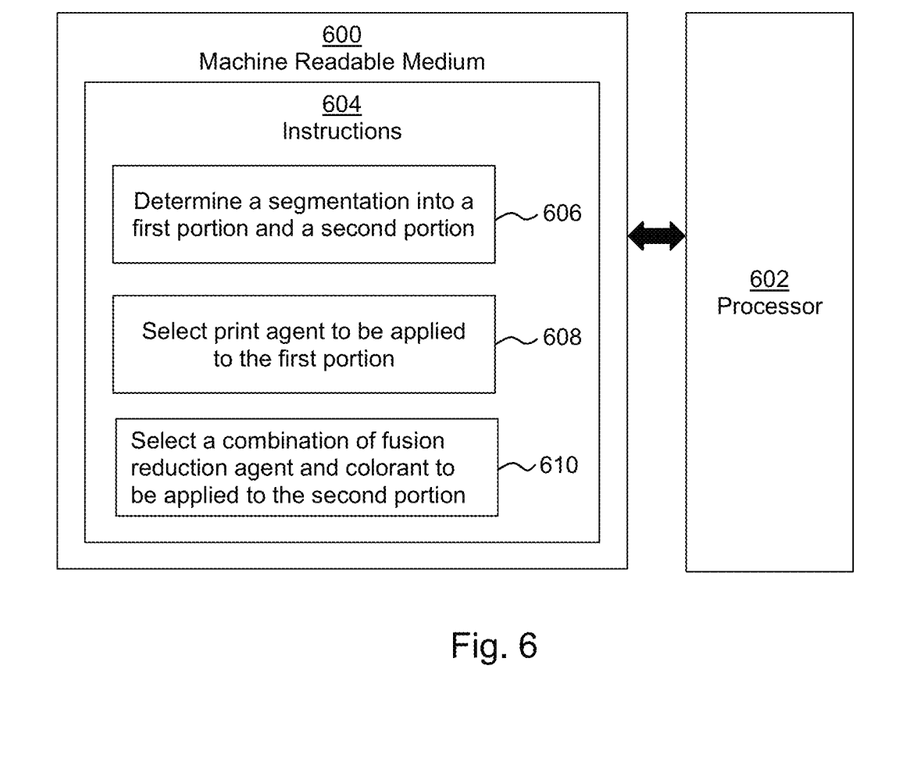
FIG. 6 is an example of a machine readable medium in association with a processor.

FIG. 6 is an example of a tangible, non-volatile, machine readable medium 600 in association with a processor 602. The machine readable medium 600 stores instructions 604 which, when executed by the processor 602, cause the processor 602 to carry out processes. The instructions 604 comprise instructions 606 to determine a segmentation of a region of build material to be provided in an additive manufacturing process into a first portion and a second portion, which is adjacent to the first portion. In some examples, this may comprise segmenting a virtual 'slice' of a build volume comprising a model of at least one object, the slice representing a layer of build material. In other examples, a first layer may provide the first portion and a second layer of build material may provide the second portion. In some examples, the instructions 606 may comprise instructions to determine the segmentation such that the first portion is a portion of the build material that is to be fused in additive manufacturing of an object, and the second portion is a portion of the build material that is to remain unfused in additive manufacturing of the object. In some examples, the instructions 606 may comprise instructions to determine the segmentation based on information from a data model. This data model may for example comprise object model data and object property data.

The instructions 604 further comprise instructions 608 to select print agent to be applied to the first portion to cause fusion thereof and to form an object having a target color. The instructions 604 further comprise instructions 610 to select a combination of fusion inhibiting agent and colorant to be applied to the second portion. The selections in instructions 608 and instructions 610 are based on a target color of the first portion.

In some examples, the instructions 604 may comprise instructions to cause the processor 602 to select the print agent and the combination of fusion inhibiting agent and colorant such that a thermal profile around the edges of build material to be fused in additive manufacturing is consistent, as described above.

In some examples, the instructions 604 may comprise instructions to cause the processor 602 to determine an amount of fusion inhibiting agent to be applied based on an energy absorptance of the colorant. In some examples, the instructions may comprise instructions to cause the processor 602 to determine an amount of fusion inhibiting agent to be applied based on an energy absorptance in the near-infrared range of the colorant.

In some examples, the instructions 604 may comprise instructions to cause the processor 602 to determine a combination of colored agents for the colorant to be applied to the first portion and a combination of colored agents for the colorant to be applied to the second portion. The combination of colored agents for the colorant to be applied to the second portion may be different from the combination of colored agents for the colorant to be applied to the first portion (although in some examples, the set of colored agents may be common for both portions).

The apparatus 400, 500 of FIG. 4 or 5 may in some examples implement at least one block of FIG. 1 and/or execute the processes described in relation to FIG. 6. The machine readable medium of FIG. 6 may in some examples implement at least one block of FIG. 1.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that various blocks in the flow charts and block diagrams, as well as combinations thereof, can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices (such as the print agent determination module 404, fusion inhibiting agent determination module 504 and the control instruction module 506) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:

providing build material;

applying, to a first portion of the build material which is to be fused in additive manufacturing, print agent comprising colorant, wherein the print agent is applied according to a target color for the first portion;

applying, to a second portion of the build material which is adjacent to the first portion, a combination of a fusion inhibiting agent and colorant, wherein the combination is applied according to the target color of the first portion; and heating the build material by exposing the build material to radiation so as to cause fusing of the first portion.

2. A method according to claim 1 wherein the colorant applied to at least one of the first and second portions comprises a combination of a plurality of colored agents.

3. A method according to claim 2 wherein the colorant applied to the second portion comprises a different combination of colored agents to a combination of colored print agents applied to the first portion.

4. A method according to claim 1 wherein an amount of fusion inhibiting agent applied is based on an energy absorptance of the colorant applied to the second portion.

5. A method according to claim 4 wherein the amount of fusion inhibiting agent which is applied is based on the energy absorptance in a near-infrared range of the colorant applied to the second portion.

6. A method according to claim 1 wherein the print agent is applied to the first portion and the second portion of the build material such that a thermal profile of a boundary between the first portion and the second portion is substantially uniform along the boundary.

7. An apparatus comprising processing circuitry, the processing circuitry comprising:

a print agent determination module to determine, based on a target color of a first portion of build material to be fused in additive manufacturing of an object, a combination of fusion inhibiting agent and colorant to be applied to a second portion of build material adjacent to the first portion which is to remain unfused in additive manufacturing of the object, wherein the combination of fusion inhibiting agent and colorant is to provide the target color.

8. An apparatus according to claim 7 in which the print agent determination module is to determine the combination of fusion inhibiting agent and colorant to be applied to the second portion such that a color of the second portion matches the target color of the first portion after fusion of the first portion.

9. An apparatus according to claim 7 in which the processing circuitry further comprises a fusion inhibiting agent determination module to determine an amount of a fusion inhibiting agent to be applied to the second portion of build material based on an energy absorptance of the colorant applied to the second portion.

10. An apparatus according to claim 7 in which the processing circuitry further comprises a control instruction module to generate control instructions for generating an object using the combination of fusion inhibiting agent and colorant for the second portion of build material.

11. An apparatus according to claim 10 further comprising an object generation apparatus to generate the object according to the control instructions.

12. A machine readable medium storing instructions which, when executed by a processor, cause the processor to:

determine a segmentation of a region of build material in an additive manufacturing process into a first portion and a second portion, wherein the first portion is adjacent to the second portion;

select print agent to be applied to the first portion to cause fusion thereof and to form an object having a target color; and select a combination of fusion inhibiting agent and colorant to be applied to the second portion, wherein the selections are based on a target color of the first portion.

13. A machine readable medium according to claim 12 further storing instructions which, when executed by a processor, cause the processor to:

select the print agent and the combination of fusion inhibiting agent and colorant such that a thermal profile of a boundary between the first portion and the second portion is uniform along the boundary.

14. A machine readable medium according to claim 13 further storing instructions which, when executed by a processor, cause the processor to:

determine an amount of fusion inhibiting agent to be applied based on an energy absorptance of the colorant to be applied to the second portion.

15. A machine readable medium according to claim 12 further storing instructions which, when executed by a processor, cause the processor to:

determine a combination of colored agents for the colorant to be applied to the first portion and a combination of colored agents for the colorant to be applied to the second portion, wherein the combination of colored agents for the colorant to be applied to the second portion is different from the combination of colored agents for the colorant to be applied to the first portion.

* * * * *